UNITED STATES PATENT OFFICE 2,220,243

2 - METHYL - 4 - AMINO - 5 - THIOFORMYL - AMINOMETHYLPYRIMIDINE AND PROCESS FOR THE MANUFACTURE OF AMIDES OF THIOFORMIC ACID

Max Hoffer, Basel, Switzerland, assignor to Hoffmann-La Roche Inc., Nutley, N. J., a corporation of New Jersey No Drawing. Application June 28, 1937, Serial No. 150,886. In Switzerland August 14, 1936

6 Claims. (Cl. 260—251)

Thioformyl amides have so far been obtained by causing hydrogen sulphide to react with isonitriles, or by the action of phosphorus pentasulphide on formic acid. These processes are tedious, the product being mostly obtained in bad yield and in a form difficult to purify. Moreover, these processes, especially the second, are not applicable in the case of substances which can react further.

It has now been found that thioformyl amides can be obtained by a simple and easy method and mostly in excellent yield by allowing dithioformic acid or its salts to react with ammonia or amines. The reaction proceeds under very mild conditions and is successful even if further reactive groups are present in the reacting amine. According to the process claimed, o-phenylene diamine, for instance, may be converted into the mono-thioformyl compound although the second amino group could either be thioformylated or give rise to the formation of benzimidazole. Another great advantage of the new method lies in the fact that it is generally applicable. Aliphatic, hydroaromatic and aromatic amines behave in the same manner towards dithioformic acid and its salts, and amines of heterocyclic systems are no exception.

To carry out the reaction, the amine is mixed with dithioformic acid in a suitable solvent, the reaction proceeding in most cases at room temperature. It is obvious that the same result can be obtained by using salts of the amine and alkali salts of dithioformic acid; but it is surprising that the free base also reacts with alkali salts of dithioformic acid to form the corresponding thioformyl-amine.

Example 1

93 parts by weight of aniline are dissolved in 200 parts by weight of alcohol and treated with a solution of 120 parts by weight of potassium dithioformate in 240 parts of water at +10° C. After a short time the separation of the difficultly soluble thioformanilide begins and after two hours the product has separated in quantitative yield. The crude product melts at 137° C.

If, for instance, 123 parts by weight of p-anisidine are used instead of 93 parts by weight of aniline, the reaction proceeds in the same manner. The thioformylanisidine crystallises from alcohol in small prisms melting at 128° C.

Example 2

A concentrated aqueous solution, prepared from 108 parts by weight of o-phenylene diamine, is gradually treated at 0° C. with a solution of 100 parts by weight of potassium dithioformate dissolved in 200 parts of water. After standing for 12 hours at 0° C., the product is sucked off and washed with water. The monothioformyl-o-phenylene diamine produced melts in the freshly prepared state at 77° C. with decomposition. On keeping the product at room temperature it soon changes to benzimidazole with separation of hydrogen sulphide.

Example 3

A solution of 151 parts by weight of monoacetyl-o-phenylene diamine in 5,000 parts of water is mixed with a solution of 140 parts by weight of potassium dithioformate in 300 parts of water at +10° C. In the course of 12 hours thioformyl-acetyl-o-phenylene diamine separates without temperature change in practically theoretical quantity. Melting point 173° C.

Example 4

78 parts by weight of dithioformic acid are covered with 400 parts by weight of ethyl ether and slowly mixed with 120 parts by weight of aqueous ammonia (25%) at 0° C. The addition is made with constant stirring. The product is allowed to stand for two days following which the ethereal layer is removed and the aqueous layer repeatedly extracted with ether. The united extracts are dried as completely as possible over phosphorus pentoxide. The ethereal solution is now concentrated to about 160 parts by weight, cooled to —15° C. and the thioformamide separated in solid form by the gradual addition of petroleum ether. The yield amounts to 50% of the theoretical quantity.

Example 5

An approximately 10% solution of ethylamine in ether containing a total of 45 parts by weight of ethylamine is mixed with 78 parts by weight of dithioformic acid at 0° C. The product is now left to stand for 24 hours at room temperature, the solvent then distilled off, and the residue distilled under reduced pressure. The N-ethyl thioformamide boils at 125° C. at a pressure of 10 mm.

Example 6

78 parts by weight of ethylene diamine hydrate are dissolved in 500 parts of water and treated with a solution of 180 parts by weight of potassium dithioformate in 500 parts of water while stirring at +5 to +10° C. After standing for 12 hours the separation of dithioformyl ethylenediamine is completed. For purification the product is separated from the liquor and crystallised from dilute alcohol; its melting point is 146–147° C.

Example 7

123 parts by weight of 1-phenyl-2,3-dimethyl-4-amino-5-pyrazolone are dissolved in 1,000 parts of water and treated with a solution of 140 parts by weight of potassium thioformate in 300 parts of water. The 1-phenyl-2,3-dimethyl-4-thioformylamino-5-pyrazolone separates after a few minutes in yellowish crystals. After 12 hours the crystals are separated from the liquid and washed with water. The compound melts at 175° C.

Example 8

21 parts by weight of 2-methyl-4-oxy-5-aminomethylpyrimidine-hydrochloride are dissolved in 200 parts of water; 20 parts by weight of potassium carbonate are added and the product is treated at +10° C. with a solution of 15 parts by weight of potassium dithioformate in 50 parts of water. The aqueous solution is now saturated with carbon dioxide and thereafter left to stand for 24 hours. In this way the 2-methyl-4-oxy-5-thioformylaminomethylpyrimidine slowly crystallises. It can be recrystallised from water. The compound forms colourless crystals melting at 199–200° C.

Example 9

211 parts by weight of 2-methyl-4-amino-5-aminomethylpyrimidinedichlorohydrate ("Zeitschrift für physiologische Chemie," volume 242, 1936, page 95) are dissolved in 1,600 parts of water and neutralised while stirring by the addition of 750 parts by weight of a potassium carbonate solution containing 138 parts by weight of $K_2CO_3$. While stirring continually, 252 parts by weight of hydrated neutral sodium sulfite and 116 parts by weight of potassium dithioformate are then added. The reaction-product is heated to 50–55° C. A clear solution is temporarily formed after which the stirring is stopped. After a few minutes the 2-methyl-4-amino-5-thioformylaminomethylpyrimidine commences to separate, and after an hour the reaction is completed. The product is cooled and filtered. For purification the crude substance can be dissolved while still moist in 25% acetic acid and, after decolorisation, precipitated with ammonia. The 2-methyl-4-amino-5-thioformylaminomethylpyrimidine forms colourless crystals melting at 189–190° C. The substance is very difficultly soluble in water, and only slightly soluble in organic solvents; it is, however, easily dissolved by dilute acids and strong alkalies.

I claim:

1. A process for the manufacture of amides of thioformic acid consisting in causing a material selected from the group consisting of dithioformic acids and dithioformic acid salts to react with material selected from the group consisting of amines, ammonia and amine salts in the presence of a solvent.

2. The manufacture of amides of thioformic acids consisting in causing dithioformic acids to react with amines in the presence of a solvent.

3. The manufacture of amides of thioformic acids consisting in causing salts of dithioformic acids to react with amines in the presence of a solvent.

4. The manufacture of 2-methyl-4-amino-5-thioformylaminomethylpyrimidine consisting in causing potassium-di-thioformate to react with 2-methyl-4-amino-5-aminomethyl-pyrimidine-di-chlorohydrate in the presence of a solvent.

5. The manufacture of 2-methyl-4-amino-5-thioformylaminomethylpyrimidine consisting in causing potassium-di-thioformate to react with 2-methyl-4-amino-5-aminomethyl-pyrimidine-di-chlorohydrate in the presence of water.

6. 2-methyl-4-amino-5-thioformylaminomethylpyrimidine.

MAX HOFFER.